United States Patent [19]

Schueler et al.

[11] Patent Number: 5,053,440

[45] Date of Patent: Oct. 1, 1991

[54] POLYMERIC MATERIALS WHICH CAN BE INSCRIBED BY LASER LIGHT

[75] Inventors: Ralf Schueler, Recklinghausen; Christian Herkt-Maetzky, Haltern; Wilfried Bartz, Marl, all of Fed. Rep. of Germany

[73] Assignee: Huels Aktiengesellschaft, Marl, Fed. Rep. of Germany

[21] Appl. No.: 504,840

[22] Filed: Apr. 5, 1990

[30] Foreign Application Priority Data

May 27, 1989 [DE] Fed. Rep. of Germany ....... 3917294

[51] Int. Cl.$^5$ .......................... G03C 1/76; C08K 3/10
[52] U.S. Cl. ..................................... 523/137; 524/413; 430/273; 430/541; 430/945
[58] Field of Search ................ 523/137; 524/406, 413, 524/525; 430/273

[56] References Cited

U.S. PATENT DOCUMENTS

| | | | |
|---|---|---|---|
| 4,175,071 | 11/1979 | Chen et al. | 524/525 |
| 4,548,889 | 10/1985 | Nemoto et al. | 430/273 |
| 4,567,220 | 1/1986 | Schüler et al. | 524/413 |
| 4,959,406 | 9/1990 | Foltin et al. | 524/413 |

OTHER PUBLICATIONS

Arthur Linz, Molybdenum Orange Pigments, Industrial and Engineering Chemistry 31, 298–306, 1939.
Manukhin, A. V.; Plaksin, O. A.; Stepanov, V. A.: Laser-Radiation-Induced Changes of Optical Properties of Vanadium Pentoxide and Molybdenum Trioxide Films, Pis'ma Zh. Tekh. Fiz., 14(16), 1467–70, 1988.
Computer Printout of the abstract of reference S.

*Primary Examiner*—Joseph L. Schofer
*Assistant Examiner*—Wu C. Cheng
*Attorney, Agent, or Firm*—Oblon, Spivak, McClelland, Maier & Neustadt

[57] ABSTRACT

Molding compounds, semi-finished products and finished articles comprising polymeric material which can be inscribed by means of laser light. The products contain an additive which is virtually colorless in the visible spectral range and produces a marking with high color contrast in the visible spectral range under the effect of laser light outside the visible range.

1 Claim, No Drawings

POLYMERIC MATERIALS WHICH CAN BE INSCRIBED BY LASER LIGHT

BACKGROUND OF THE INVENTION

1. Field of the Invention

The invention relates to molding compounds, semi-finished products or finished articles of high-polymeric materials which can be or have been inscribed by means of laser light.

2. Discussion of the Background

It is known to make a polymeric material which can be inscribed by means of laser light by mixing in with the polymeric plastic of the base material a filler which changes color under the effect of energy radiation. If it is desired to keep the costs of fillers low, only a partial amount of filler is mixed in with the polymeric base material (DE-OS 2,936,926). In particular, a high-contrast light-colored inscription in the natural color of the plastic on a black background can be produced on the plastic surface by laser irradiation after incorporating 0.08 to 0.125% carbon black or graphite as filler. The whiteness of the characters can be improved by optical brighteners which are added to the pigments and which are not destroyed by the laser light (German Patent No. 3,044,722).

Also known are molded articles, consisting of thermoplastics which contain a polymer having aromatic structure, which exhibit very good black coloring due to laser irradiation even without an additive which can change color. However, the various grades of thermoplastics react very differently; there must be considerable coordination of process parameters, and possibly also of material modifications. It is necessary to have coloration which is adjusted optimally for the laser light and of which the light stability remains in the usual limits for the product class concerned. In the case of large molded articles, restrictions in processing are encountered, depending on the grade of thermoplastic (Kunststoffe 78 (1988), issue 8, pages 688 to 691).

A material which can be inscribed well by laser and which has good thermal stability and stress cracking resistance is obtained by mixing polycarbonate with 10 to 50% of an aromatic polyester (European Patent No. 0,249,082).

Finally, a process for the laser inscription of high-molecular weight organic materials is known in which good inscription properties are achieved by incorporating additives (European Patent No. 0,190,997). In particular, commerically available pigments and/or polymer-soluble dyes are used as coloring additives. An inscription of adequate contrast on the surface of the materials of which the color has been adjusted with these additives can be produced by means of a Nd-YAG laser, preferably of doubled frequency (wavelength 532 nm after frequency doubling).

Consequently, according to the prior art, a polymeric composition can be adjusted in such a way that it can be inscribed by laser light, whether by choosing a grade of thermoplastic having good laser inscription properties or by incorporating an additive which changes color under the effect of laser irradiation. Both methods frequently produce a product which can be inscribed with adequately high contrast by laser light. However, other required material properties relating to applications are met only inadequately. The prior art does not allow a complete application profile to be set up on a modular basis with one of the requirements being that of good laser inscription properties.

This shortcoming will be illustrated by an example from data processing. For the caps on computer keyboards, the contrast ratio of the inscribed caps of the keys must be at least 3:1. For reasons of cost, keyboards are inscribed with a laser system. Along with the requirement for good laser inscription properties, the keyboard material must have high abrasion resistance and be adjusted to a certain color. So far, no satisfactory solution is known because, after material selection, either the properties of the material and its coloration meet the desired requirements but the material is unsatisfactory for laser inscription, or the material can be inscribed well by laser but the other material properties are not satisfactory.

SUMMARY OF THE INVENTION

One object of the present invention is to produce a polymeric product (molding compounds, semi-finished products and finished articles) made of a polymeric material which can be marked and/or inscribed by means of laser light without impairment of material properties or performance characteristics of the product. In such marking or inscription, a prescribed minimum contrast ratio should be achieved. The suitability for laser inscription should be independent of the grade of material and of the adjusted color of the molding compound.

This object and other objects are achieved by the present polymeric product, i.e., the molding compound, and consequently the semi-finished products and finished articles produced from it, containing 0.02 to 5% of an additive which has no inherent color or substantially no inherent color (only a slight inherent color) in the visible spectral range (light wavelength about 400 to 750 nm) and produces a marking with high color contrast in the visible spectral range under the effect of laser light of which the wavelength is outside the visible range (below about 400 nm or above about 900 nm). The color contrast may be produced, for example, by the additive changing into a colored product under the effect of laser light. Examples of lasers which may be used include a Nd-YAG laser (wavelength 1064 nm) or an excimer laser (wavelength 308 nm or 351 nm).

Any additive having the characteristics noted above may be used as the additive in the present invention, however preferred additives are 0.02 to 4.5% by weight of copper (II) hydroxide phosphate (referred to hereinafter as CHP), 0.2 to 2.0% by weight titanium dioxide or 0.2 to 2.5% by weight of molybdenum (VI) oxide ($MoO_3$). In addition to the colorless or only slightly colored additive, the molding compound may contain further pigments and/or dyes for the purpose of coloration.

The preparation of CHP ($Cu_3(PO_4)_2 \cdot Cu(OH)_2$; libethenite) is described, for example, in Gmelins Handbuch der anorganischen Chemie, volume 60, part A, page 175 and part B, pages 920 to 925. CHP which has been prepared in accordance with European Patent No. 0,143,933 is preferred.

After marking or inscription by means of the laser, the inscribed polymeric products of the present invention should have a contrast ratio (K) of at least 3:1. For dark characters on a light background, the contrast ratio is defined as the quotient of the background luminescence to the character luminescence (background/- character). The contrast ratio is preferably at least 5:1 and more preferably 7:1.

There is no particular limitation on the type of polymeric material which may be used in the present invention. For example, polystyrenes, polyolefins, polyamides, polyesters, etc. may all be used as the polymeric material of the present invention. Both aliphatic and aromatic monomer-containing polymers may be used. The polymeric materials which are preferred are those polymeric materials which are conventionally used for injection molding of plastic sheets, articles, etc.

The molding compounds, semi-finished products and finished articles according to the invention have the following advantages:

(1) The additive used is virtually colorless in the visible spectral range (400 to 750 nm). The molding compounds containing such an additive can be colored as desired with pigments and/or dyes.

(2) The additive does not influence the mechanical properties of the molding compounds, semi-finished products and finished articles.

(3) The additive has a high absorptivity in the infrared and/or ultraviolet spectral range and is consequently sensitive to infrared and/or ultraviolet laser light.

(4) For inscribing the semi-finished products and finished articles according to the invention, an infrared laser (without frequency doubling) or an ultraviolet laser is used.

(5) A large number of polymeric materials — irrespective of the grade of material, colorant and other incorporated substances — can be inscribed by laser light while maintaining other material properties.

(6) The inscription has a high contrast ratio. To increase the contrast, no additional additives (such as optical brighteners) are necessary.

(7) The additive used entails only a small cost, even if the entire molding compound contains the additive in the specified concentration.

(8) The characters applied to the semi-finished products and finished articles have outstanding light resistance.

(9) No restrictions in processing the molding compounds and semi-finished products according to the invention arise even in the case of large molded articles.

Having now described this invention, a further understanding can be obtained by reference to certain specific examples which are provided herein for purposes of illustration only and are not intended to be limiting unless otherwise specified.

The expression "parts" indicates parts by weight. The contrast ratio K is measured by the methods known from the literature. For dark characters on a bright background, K is defined as the quotient of background luminance to the character luminance. In Examples 1 to 14, a Nd-YAG laser having a wavelength of 1064 nm in pulse control operation, a pulse frequency of 8 kHz and a laser output of about 5 W was used for inscribing semi-finished products and finished articles. The illuminance in the plane of inscription was about $100 \text{ J} \cdot \text{cm}^{-2}$. The dark marking produced in each case was readily perceptible; its surface condition scarcely differs from the condition of an unexposed point on the surface.

EXAMPLES

Example 1

On injection-molded sheets consisting of 100 parts of polybutylene terephthalate (PBT) and 1 part of CHP, a dark inscription was produced on a natural-colored background with the contrast $K = 7.6$.

Example 2

On injection-molded sheets analogous to Example 1 which additionally contain 1 part of red iron oxide, a dark inscription was produced on a red background with $K = 4.3$.

Example 3

On injection-molded sheets analogous to Example 1 which additionally contain 0.5 parts of titanate yellow, a dark inscription was produced on a yellow background with $K = 5.8$.

Example 4

On injection-molded sheets analogous to Example 1 which additionally contain 1 part of titanium dioxide, a dark inscription was produced on a white background with $K = 8.5$.

Example 5

On injection-molded sheets consisting of 100 parts of PBT and 1 part of $MoO_3$, a dark inscription was produced on a natural-colored background with $K = 3.8$.

Example 6

On injection-molded sheets consisting of 100 parts of polyethylene and 1.5 parts of CHP, a dark inscription was produced on a natural-colored background with $K = 7.5$.

Example 7

On injection-molded sheets consisting of 100 parts of polypropylene and 1.5 parts of CHP, a dark inscription was produced on a natural-colored background with $K = 7.2$.

Example 8

On injection-molded sheets consisting of 100 parts of polystyrene and 1.5 parts of CHP, a dark inscription was produced on a natural-colored background with $K = 8.1$.

Example 9

On injection-molded sheets consisting of 100 parts of polyamide 6,6 and 1.5 parts of CHP, a dark inscription was produced on a natural-colored background with $K = 7.8$.

Example 10

On injection-molded sheets consisting of 100 parts of polyamide 6 and 1.5 parts of CHP, a dark inscription was produced on a natural-colored background with $K = 7.7$.

Example 11

On injection-molded sheets consisting of 100 parts of polyamide 12 and 1.5 parts of CHP, a dark inscription was produced on a natural-colored background with $K = 6.5$.

Example 12

On capacitor casings produced from a molding compound which consists of 100 parts of PBT adjusted to be self-extinguishing and 1.4 parts of CHP, a dark inscription was produced on a yellow-green background with K= 4.8.

Example 13

On key caps produced from a molding compound which consists of 100 parts of PBT, a total of 0.8 parts of various pigments and 1.7 parts of CHP, a dark inscription was produced on a beige-colored background with K= 4.5.

Example 14

On plug connectors produced from a molding compound which consists of 100 parts of PBT adjusted to be self-extinguishing and reinforced with glass fibers and 0.4 parts of CHP, a dark inscription was produced on a virtually white background with K= 3.9.

In Examples 15 and 16, an excimer laser having a wavelength of 351 nm was used for inscribing semi-finished products and finished articles. The illuminance in the plane of inscription was about 1 J·cm$^{-2}$. The marking produced in each case was readily perceptible; its surface condition virtually does not differ from the condition of an unexposed point on the articles.

Example 15

On capacitor casings produced from a molding compound which consists of 100 parts of PBT, 1 part of CHP and 1 part of red iron oxide, a dark inscription was produced on a red background with K= 4.5.

Example 16

On key caps produced from a molding compound which consists of 100 parts of PBT, a total of 0.7 parts of a blue pigment and 1 part of titanium dioxide, a dark inscription was produced on a blue background with K= 3.8.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A polymeric product, comprising:
a polymeric material comprising about 0.02–4.5 wt. % copper hydroxide phosphate, wherein said material absorbs laser light of a wave length which is outside the visible spectral range of 400 nm to 750 nm to produce an inscribed polymeric product having a high color contrast inscription.

* * * * *